(12) United States Patent
Branciforte et al.

(10) Patent No.: US 11,144,367 B2
(45) Date of Patent: Oct. 12, 2021

(54) WRITE POWER OPTIMIZATION FOR HARDWARE EMPLOYING PIPE-BASED DUPLICATE REGISTER FILES

(71) Applicant: INTERNATIONAL BUSINESS MACHINES CORPORATION, Armonk, NY (US)

(72) Inventors: Richard Joseph Branciforte, Austin, TX (US); Gregory William Alexander, Pflugerville, TX (US); Avraham Ayzenfeld, Hod Hasharon (IL); Edward Thomas Malley, New Rochelle, NY (US); Jonathan Ting Hsieh, Poughkeepsie, NY (US); Gregory Miaskovsky, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/270,632

(22) Filed: Feb. 8, 2019

(65) Prior Publication Data

US 2020/0257572 A1    Aug. 13, 2020

(51) Int. Cl.
*G06F 9/00* (2006.01)
*G06F 9/52* (2006.01)
*G06F 9/38* (2018.01)
*G06F 9/30* (2018.01)

(52) U.S. Cl.
CPC ............ *G06F 9/52* (2013.01); *G06F 9/3013* (2013.01); *G06F 9/382* (2013.01); *G06F 9/3012* (2013.01); *G06F 9/30138* (2013.01); *G06F 9/3891* (2013.01)

(58) Field of Classification Search
None
See application file for complete search history.

(56) References Cited

U.S. PATENT DOCUMENTS

| | | |
|---|---|---|
| 5,666,300 A | 9/1997 | Adelman et al. |
| 8,209,519 B2 | 6/2012 | Tanabe |
| 8,725,991 B2 | 5/2014 | Wang et al. |
| 9,182,992 B2 | 11/2015 | Guerrero |

(Continued)

OTHER PUBLICATIONS

Brown, Mary D. et al. "Demand-Only Broadcast: Reducing Register File and Bypass Power in Clustered Execution Cores" Electrical and Computer Engineering; The University of Texas at Austin; May 2004; 9 pgs.

(Continued)

*Primary Examiner* — Midys Rojas
(74) *Attorney, Agent, or Firm* — Cantor Colburn LLP; Margaret McNamara

(57) ABSTRACT

Methods and systems for controlling writing to register files in a processing system having at least two execution pipelines are provided. Aspects include obtaining a micro operation for execution by an execution unit of a first pipeline in the processing system, wherein the micro operation includes writing data to a register file. Aspects also include determining whether the data will be accessed by an execution unit of a second pipeline in the processing system. Based on a determination that the data will only be accessed by the execution unit of the first pipeline, aspects include blocking writing of the data to a register file of the second pipeline.

5 Claims, 3 Drawing Sheets

(56) References Cited

U.S. PATENT DOCUMENTS

| | | | |
|---|---|---|---|
| 9,747,104 B2 | 8/2017 | Chen et al. | |
| 9,927,862 B2 | 3/2018 | Shearer et al. | |
| 10,157,061 B2 | 12/2018 | Corbal et al. | |
| 10,192,601 B2 | 1/2019 | Berger et al. | |
| 10,628,157 B2* | 4/2020 | Carro | G06F 9/3836 |
| 2003/0135677 A1* | 7/2003 | Louzoun | G06F 9/52 |
| | | | 710/240 |
| 2004/0148494 A1 | 7/2004 | Civlin | |
| 2006/0168463 A1 | 7/2006 | Terechko et al. | |
| 2009/0132793 A1 | 5/2009 | Venkamahanti et al. | |
| 2011/0004743 A1 | 1/2011 | Lutz | |
| 2012/0110271 A1* | 5/2012 | Boersma | G06F 9/30189 |
| | | | 711/147 |
| 2013/0290681 A1 | 10/2013 | Keller et al. | |
| 2018/0329711 A1 | 11/2018 | Ghiya | |
| 2018/0357064 A1 | 12/2018 | Chen et al. | |
| 2020/0342985 A1* | 10/2020 | Toth | A61B 5/01 |

OTHER PUBLICATIONS

Karuri, Kingshuk et al. "Increasing Data-Bandwidth to Instruction-Set Extensions through Register Clustering" 2007 IEEE; pp. 166-171.

Sadrosadati, Mohammad et al. "LTRF: Enabling High-Capacity Register Files for GPUs via Hardware/Software Cooperative Register Prefetching", ASPLOS '18; Mar. 24-28, 2018; 14 pgs.

Sato, Yukinori "Power Estimation of Partitioned Register Files in a Clustered Architecture with Performance Evaluation", IEICE Trans. Inf. & Syst., vol. E90-D, No. 3; Mar. 2007; Japan Advanced Institute of Science and Technology; 12 pgs.

* cited by examiner

WRITE POWER OPTIMIZATION FOR HARDWARE EMPLOYING PIPE-BASED DUPLICATE REGISTER FILES

BACKGROUND

The present invention relates generally to the field of instruction processing and more particularly to controlling writing to registers in an instruction processing pipeline.

The instruction set architecture of many CPUs references a set of registers which are used to stage data between memory and the functional units on the chip. In processing systems that have more than one execution pipeline, each pipeline may include a separate register file. Currently, all general purpose register (GPR) writes performed by the execution unit of either pipeline writes data to the register file for each execution pipeline.

SUMMARY

According to an embodiment described herein, a method for controlling writing to register files in a processing system having at least two execution pipelines is provided. The method includes obtaining a micro operation for execution by an execution unit of a first pipeline in the processing system, wherein the micro operation includes writing data to a register file. The method also includes determining whether the data will be accessed by an execution unit of a second pipeline in the processing system. Based on a determination that the data will only be accessed by the execution unit of the first pipeline, the method further includes blocking writing of the data to a register file of the second pipeline.

According to an embodiment described herein, a processing system having a decode and dispatch unit and a plurality of instruction processing pipelines is provided. Each instruction processing pipeline includes an execution unit and a register file. The decode and dispatch unit is configured to obtain an micro operation for execution by an execution unit of a first pipeline of the plurality of instruction processing pipelines, wherein the micro operation includes writing data to a register file of the first pipeline. The decode and dispatch unit is also configured to determine whether the data will be accessed by an execution unit of a second pipeline of the plurality of instruction processing pipelines. The decode and dispatch unit is further configured to block writing of the data to a register file of the second pipeline based on a determination that the data will only be accessed by the execution unit of the first pipeline.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

In traditional pipelined processing systems containing multiple register files, when a general purpose register (GPR) write gets issued to an execution unit on a pipeline, the results are always written to the register file of each pipeline because the identity of the execution unit that will use the data is not known. In exemplary embodiments, when an instruction is decoded, it is determined if data written by a GPR write instruction will only be accessed by the pipeline that executes the instruction. In these cases, the GPR write for the other pipelines is blocked, thereby reducing the power consumption of the processing system. As used herein, a micro operation is a part of an instruction that is executed by an execution part of a pipeline. A single instruction may be made of one or more micro operations.

In one embodiment, a determination that data written by a micro operation will only be accessed by the pipeline that executes the micro operation is based on a determination that the micro operation is part of a complex instruction. As used herein, the term complex instruction refers to an instruction that performs two micro operations in which the second micro operation is dependent upon the first micro operation, such as a load and an add. For these specific types of instructions, the load of the data and the addition of that data will always occur on the same pipeline. In these cases, the load-store unit is blocked from writing to the GPR register file for pipelines on which the instruction is not being issued on.

In another embodiment, a determination that data written by a micro operation will only be accessed by the pipeline that executes the micro operation is based on a determination that the micro operation is part of an instruction in a dispatch group. In exemplary embodiments, all instructions in a dispatch group are always issued on the same pipeline. As a result, when the same GPR target is written by two micro operations in the same dispatch group, only the youngest of the micro operation needs to be written to both register files, since the intermediate targets are never visible to readers on the other pipe.

Figure 1:
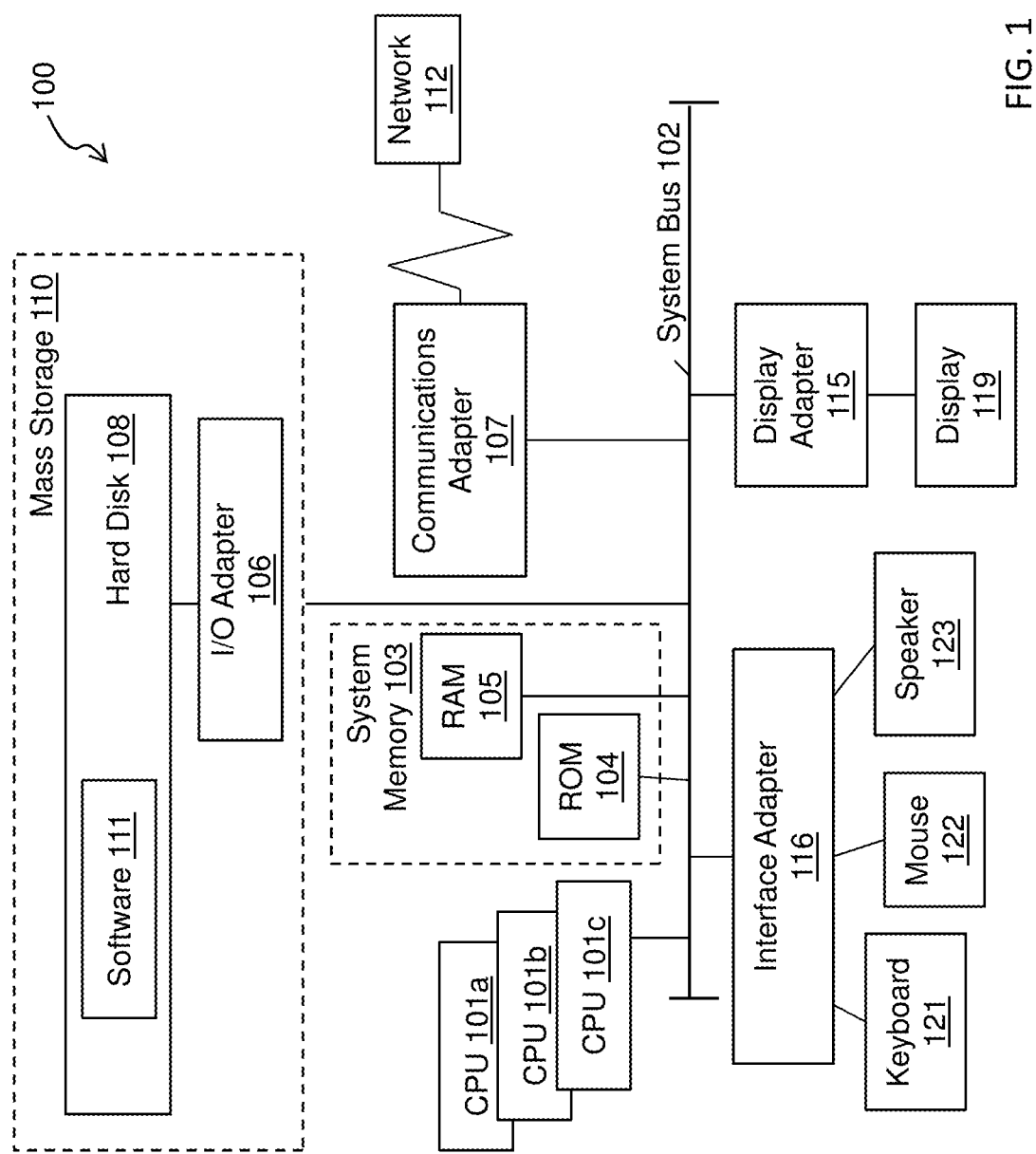
FIG. 1 is a block diagram of an example computer system for practicing the teachings herein.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with reference to FIGS. 2-3. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

Figure 2:
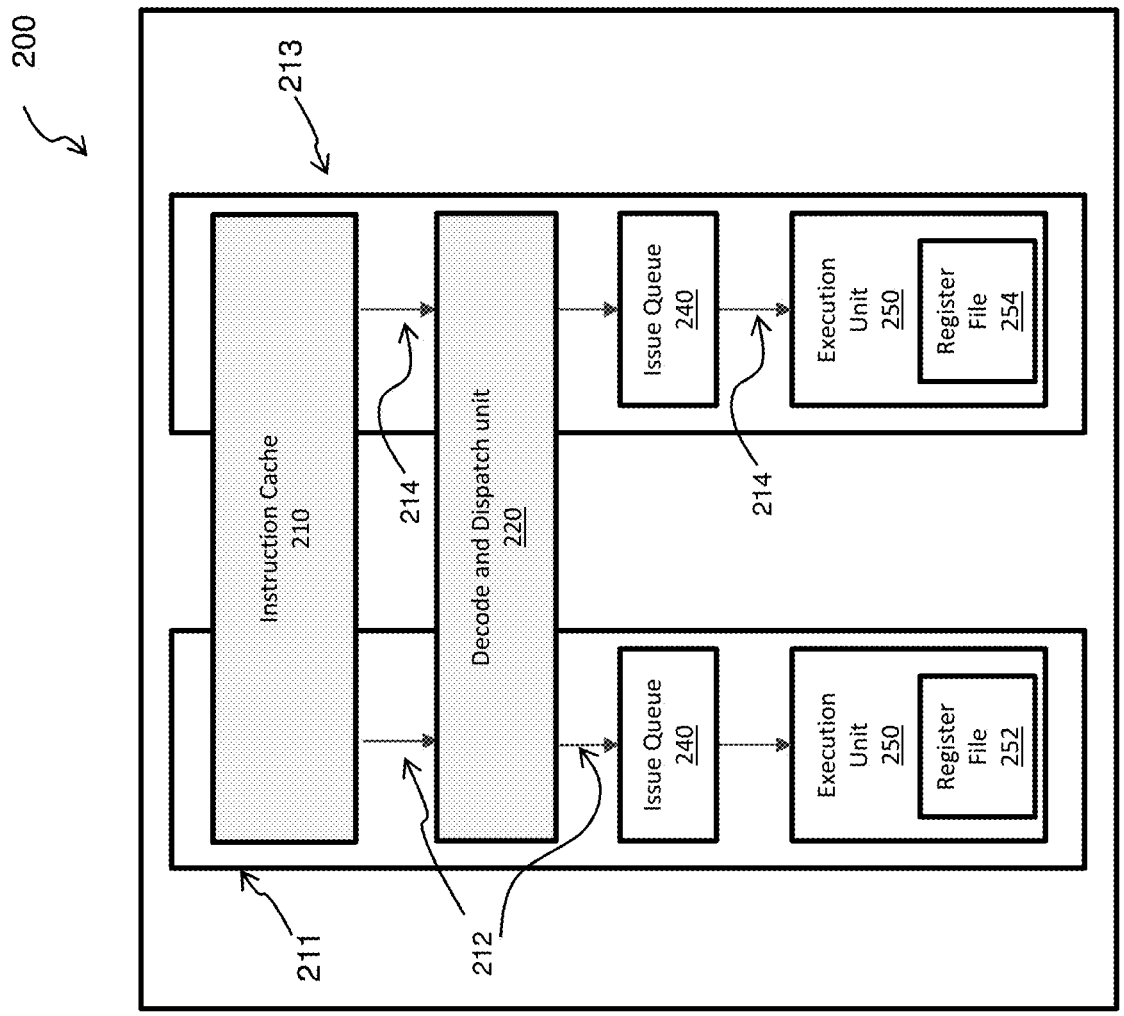
FIG. 2 is a block diagram of an instruction processing system in accordance with an embodiment.

Referring now to FIG. 2, a block diagram depicting a portion of an instruction processing system 200 in accordance with at least one embodiment of the present invention is shown. As depicted, the instruction processing system 200 includes two instruction pipelines 211, 213, which each include an instruction cache 210, an instruction decoding and dispatch unit 220, an issue queue 240, and an execution unit 250. Each of the two pipelines 211, 213 have a dedicated register file 252, 254, respectively. The instruction processing system 200 may include other elements needed for executing computer instructions that are omitted for the sake of simplicity. Furthermore, the complexity of the depicted elements is generally omitted for the sake of simplicity.

The instruction cache 210 stores processing instructions 212, 214 that can be executed by the instruction processing system 200. In some embodiments, the instruction cache 210 stores one or more cache lines. One or more program counters (not shown) may provide an address to the instruction cache 210 indicating the current index of an executed program within memory. In response thereto, the instruction cache 210 immediately, or after retrieving a page or line of instructions from main memory, provides instructions 212, 214 to the instruction decoding and dispatch unit 220. In exemplary embodiments, the instructions 212 and 214 are assigned to different execution pipelines.

The instruction decoding and dispatch unit 220 parses the instructions 212, 214 and determines that the instructions 212, 214 include a general purpose register (GPR) write. In one embodiment, the decoding and dispatch unit 220 decodes a portion of the instruction into a logical register type and a logical register number (i.e., logical register reference). The issue queue 240 queues the instructions 212, 214 as well as the register file 252, 254 and provides them as needed to the execution unit 250. The execution unit 250 executes the instructions 212, 214 and stores data relating to the instruction in one or more of the register files 252, 254.

In exemplary embodiments, when an instruction is decoded by the decoding and dispatch unit 220, it is determined if the instruction includes a GPR write micro operation that will only be accessed by the pipeline that executes the instruction. In these cases, the GPR write for the other pipelines is blocked, thereby reducing the power consumption of the processing system. In exemplary embodiments, the determination that data written by a GPR write micro operation will only be accessed by the pipeline that executes the micro operation is based on a determination that the micro operation is part of a complex instruction or that the micro operation is part of instruction in a dispatch group. As used herein, a complex instruction in an instruction that contains multiple micro operations.

In one example, a load-store unit (LSU) micro operation part of an instruction that gets issued on a first pipeline to the LSU. In this case, a signal is transmitted to the other pipelines in the system to block the LSU GPR writes for pipelines other than the first pipeline. As a result, the GPR register file for pipelines other than the first pipeline, are not powered up to be written. Next, an arithmetic logic unit (ALU) micro operation part of the instruction is issued on the first pipeline which will read the GPR register file of the first pipeline. Upon completion of the ALU micro operation, the ALU micro operation will write to the GPR register files of all pipelines in the system. As a result, the power consumption of the processing system is reduced by preventing the LSU micro operation part of the complex instruction from writing the GPR register files on pipelines that will not access the data. The subsequent ALU micro operation part will be written to all pipelines so that future instructions can see the written data no matter which pipeline they are issued on.

As discussed above, all instructions, and micro operations, in a dispatch group are dispatched together and issued on the same pipeline. As a result, when multiple micro operation in a dispatch group write to the same GPR target, only the youngest writer to that GPR target needs to be written to the register file on both pipelines. This is due to fact that the intermediate data written to the GPR targets are never visible to any readers on another pipeline. Only other readers within that group will ever see the intermediate values. This is true for any writer to a GPR and can come from an LSU or ALU.

In one example, a first group of instructions includes three instructions; a write by instruction 1; a read of the same GPR by instruction 2; and a write to the same GPR by instruction 3. A second group of instructions includes instruction 4, which is a read of the GPR. The first group of instructions is issued to a first pipeline. In this example, instruction 4 will never see the value that instruction 1 wrote to the GPR register file. Rather, instruction 4 will only ever see the value written by instruction 3, as only the youngest instruction result will survive the group. As a result, only the values for instruction 3 need to be written to the GPR register files for both pipelines. Instruction 1 only needs to be written to the GPR register files of the first pipeline. In this case, a signal to block the GPR write of instruction 1 to pipelines other than the first pipeline is transmitted by the decoding and dispatch unit. As a result, the power consumption of the processing system is reduced by preventing instruction 1 from writing the GPR register files on pipelines that will not access the data.

Figure 3:
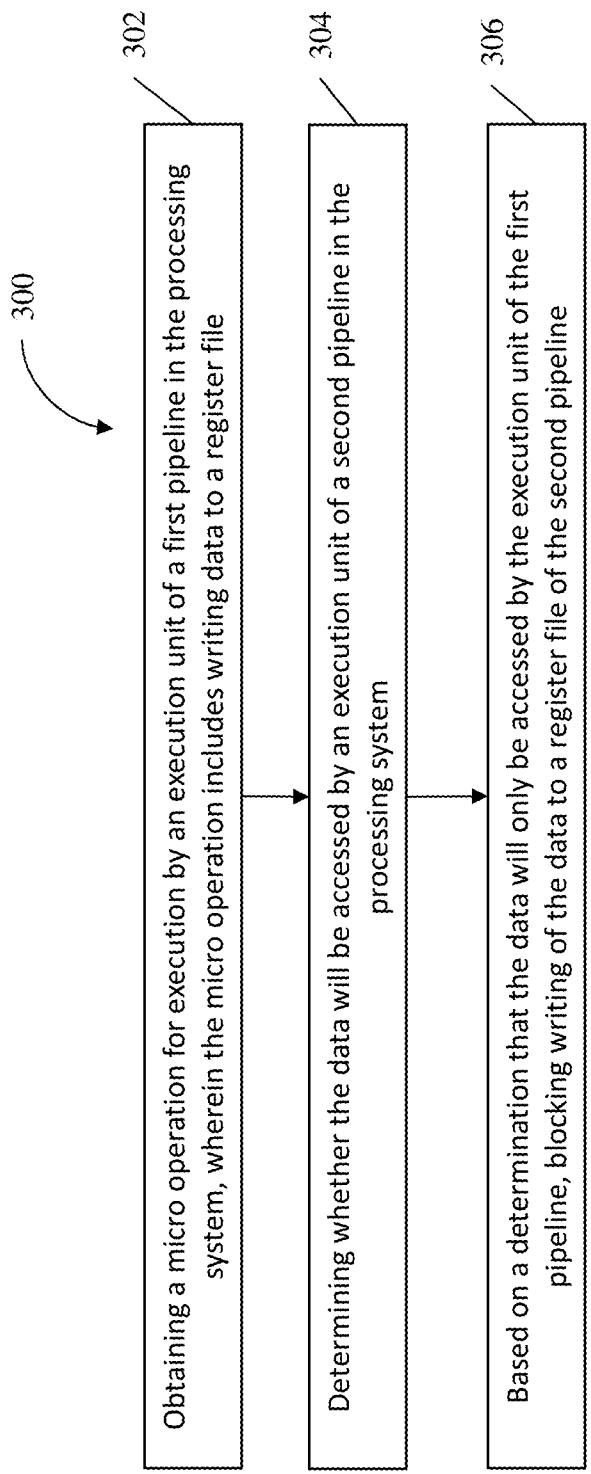
FIG. 3 is a process flow diagram of a method for controlling writing to register files in a processing system having at least two execution pipelines in accordance with an embodiment.

FIG. 3 is a process flow diagram of an example method 300 for controlling writing to register files in a processing system having at least two execution pipelines, wherein each execution pipeline includes a separate register file. The method 300 can be implemented within the memory of any suitable computing system, such as the computer system 100 of FIG. 1. As shown at block 302, the method 300 includes obtaining an micro operation for execution by an execution unit of a first pipeline in the processing system, wherein the micro operation includes writing data to a register file. Next, as shown at block 304, the method 300 includes determining whether the data will be accessed by an execution unit of a second pipeline in the processing system. The method 300 includes blocking writing of the data to a register file of the second pipeline based on a determination that the data will only be accessed by the execution unit of the first pipeline, as shown at block 306.

In one embodiment, the determination that the data will only be accessed by the execution unit of the first pipeline includes determining that the micro operation is part of a complex instruction that includes a second micro operation that will access the register file of the first pipeline. In exemplary embodiments, the complex instruction includes a load/store micro operation that writes the data to the register file and an arithmetic unit micro operation that performs an arithmetic calculation on the data stored in the register file. In this embodiment, the method 300 further includes writing data associated with the second micro operation of the complex instruction to register files of both the first pipeline and the second pipeline.

In another embodiment, the determination that the data will only be accessed by the execution unit of the first pipeline comprises determining that the micro operation is part of a group of instructions and that the group of instructions includes a second micro operation that will write to the same architected register. In exemplary embodiments, the group of instructions is an atomic group of instructions. In this embodiment, the method 300 further includes writing data associated with the second micro operation to register files of both the first pipeline and the second pipeline.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling writing to register files in a processing system having at least two execution pipelines, wherein each execution pipeline includes a register file, the method comprising:

decoding a complex instruction into a first micro operation and a second micro operation;

issuing the first micro operation to an execution unit of a first pipeline in the processing system, wherein the first micro operation includes writing a first data to a register file of the first pipeline;

determining whether the first data will be accessed by an execution unit of a second pipeline in the processing system;

based on a determination that the first data will only be accessed by the execution unit of the first pipeline, blocking writing of the first data to a register file of the second pipeline, wherein the determination that the first data will only be accessed by the execution unit of the first pipeline comprises determining that the second micro operation will access the register file of the first pipeline;

issuing the second micro operation to the execution unit of the first pipeline in the processing system; and writing a second data associated with the second micro operation of the complex instruction to register files of both the first pipeline and the second pipeline.

2. The computer-implemented method of claim 1, wherein the first micro operation writes the first data to the register file of the first pipeline and that the second micro operation performs an arithmetic calculation on the first data stored in the register file of the first pipeline.

3. A computer-implemented method for controlling writing to register files in a processing system having at least two execution pipelines, wherein each execution pipeline includes a register file, the method comprising:

decoding a complex instruction into a first micro operation and a second micro operation;

issuing the first a micro operation for execution by an execution unit of a first pipeline in the processing system, wherein the micro operation includes writing a first data to a register file of the first pipeline;

determining whether the first data will be accessed by an execution unit of a second pipeline in the processing system;

based on a determination that the first data will only be accessed by the execution unit of the first pipeline, blocking writing of the first data to a register file of the second pipeline, wherein the determination that the first data will only be accessed by the execution unit of the first pipeline comprises determining that the second micro operation will overwrite the register file written by the first micro operation;

issuing the second micro operation to the execution unit of the first pipeline in the processing system; and writing a second data associated with the second micro operation to register files of both the first pipeline and the second pipeline.

4. A processing system comprising:

a plurality of instruction processing pipelines, each instruction processing pipeline including a decode and dispatch unit, an execution unit and a register file, wherein the decode and dispatch unit is configured to:

decode a complex instruction into a first micro operation and a second micro operation;

is sue the first micro operation for execution by an execution unit of a first pipeline of the plurality of instruction processing pipelines, wherein the micro operation includes writing a first data to a register file of the first pipeline of the first pipeline;

determine whether the first data will be accessed by an execution unit of a second pipeline of the plurality of instruction processing pipelines;

based on a determination that the first data will only be accessed by the execution unit of the first pipeline, block writing of the first data to a register file of the second pipeline, wherein the determination that the first data will only be accessed by the execution unit of the first pipeline comprises determining that the second micro operation that will access the register file of the first pipeline;

issue the second micro operation to the execution unit of the first pipeline in the processing system; and write a second data associated with the second micro operation of the complex instruction to register files of both the first pipeline and the second pipeline.

5. The processing system of claim 4, wherein the first micro operation writes the first data to the register file of the first pipeline and the second micro operation performs an arithmetic calculation on the first data stored in the register file of the first pipeline.

\* \* \* \* \*